Jan. 4, 1944. O. L. WOODSON 2,338,612
AIRCRAFT COVERING ATTACHMENT
Filed June 4, 1940 2 Sheets-Sheet 1

INVENTOR
Omer L. Woodson,
BY
Beau, Brooks, Buckley & Beau.
ATTORNEYS

Jan. 4, 1944.   O. L. WOODSON   2,338,612
AIRCRAFT COVERING ATTACHMENT
Filed June 4, 1940   2 Sheets-Sheet 2
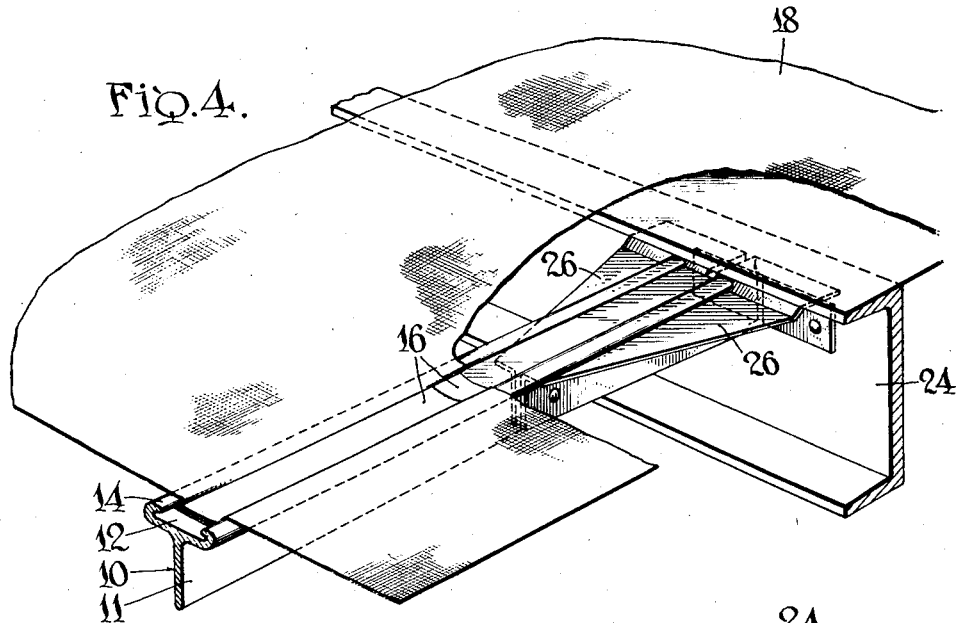
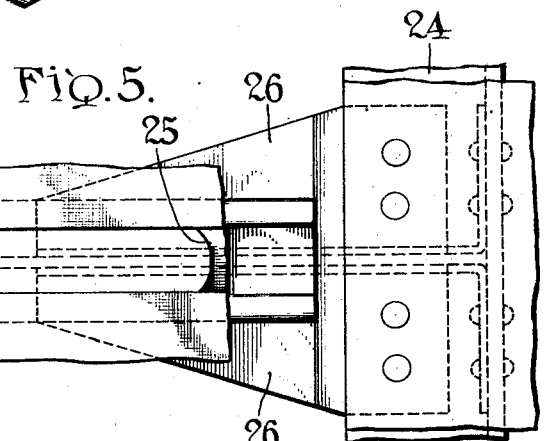
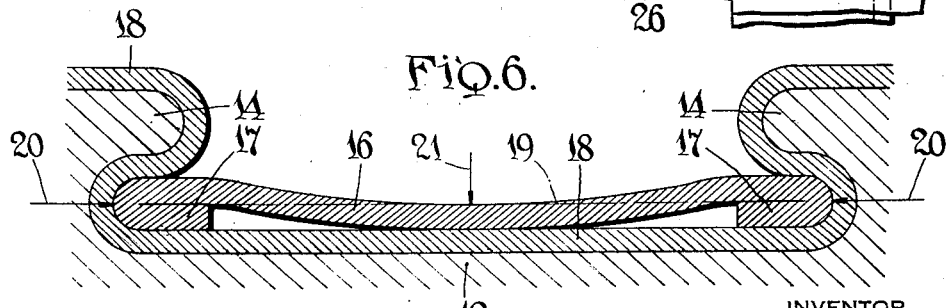
INVENTOR
Omer L. Woodson,
BY
Beau, Brooks, Buckley & Beau.
ATTORNEYS Patented Jan. 4, 1944

2,338,612

UNITED STATES PATENT OFFICE 2,338,612

AIRCRAFT COVERING ATTACHMENT

Omer L. Woodson, Buffalo, N. Y., assignor to Bell Aircraft Corporation, Buffalo, N. Y.

Application June 4, 1940, Serial No. 338,753

3 Claims. (Cl. 244—132)

This invention relates to improvements in means of attachment of covering material to aircraft wing, fuselage, fin, flap, or other framing structures. An object of the invention is to provide a covering holding means for the purpose described which is of improved form whereby the covering may be readily secured to or removed from the supporting frame structure in accord with a simplified procedure and which is adapted to maintain the covering when mounted thereon in securely locked relation in an improved manner and without danger of accidental disengagement therefrom. Another object of the invention is to provide an improved form of covering locking element in devices of the above described character whereby the danger of cutting the covering material at the points of bearing thereagainst is reduced.

The invention relates to a form of covering fastening device involving the employment of frame members having cap strip portions thereof adapted to bear against the covering material, and deformable covering-locking plates associated therewith in such manner that the side edge portions of the locking plates are held in gripped relation in connection with the frame members. The present invention provides an improved form of locking plate for the specified purpose, wherein the locking connection is of improved form and inherently stable when in finally assembled position and condition, whereby the possibility of accidental disconnection under service conditions is eliminated. The locking element of the invention is, however, readily removable by means of a simple manual process for release of the covering, as in connection with repair and/or fabric renewal operations.

Other objects and advantages of the invention will appear in the specification.

In the drawings:

Fig. 4 is a fragmentary perspective of an aircraft structure incorporating the invention;

Fig. 5 is a fragmentary plan of a structure incorporating another form of the invention; and Fig. 6 is a fragmentary section illustrating diagrammatically the directions of the forces in the assembled structure of the invention.

Figure 1:
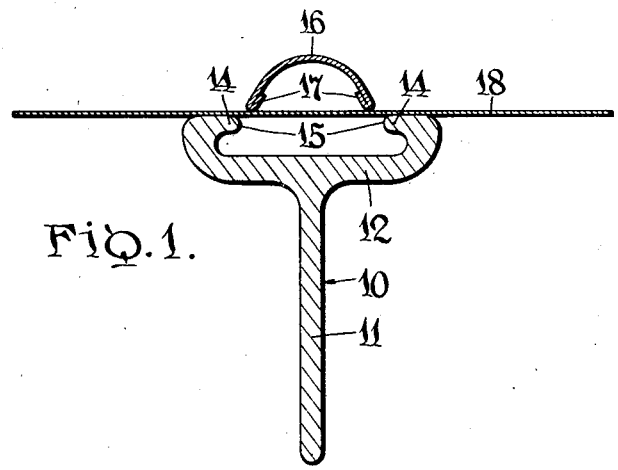
Fig. 1 is a fragmentary section of an aircraft frame member and a covering sheet and a locking device of the invention, arranged in position preparatory to assembly thereof into covering securing position.
Figure 2:
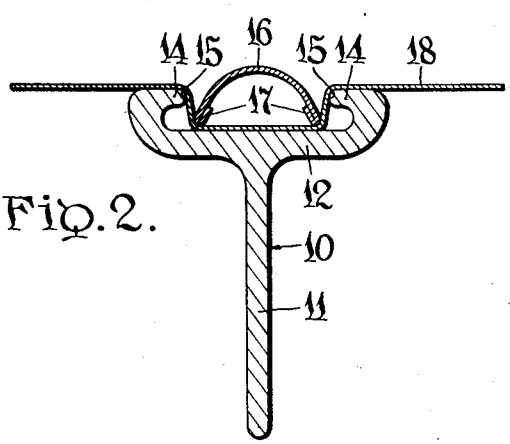
Fig. 2 is a view similar to Fig. 1 showing the elements thereof at an intermediate stage of the assembly process.
Figure 3:
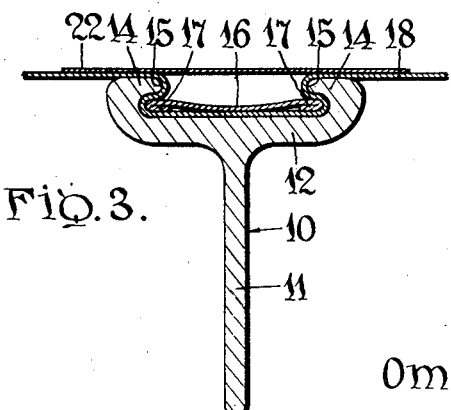
Fig. 3 is a view similar to Figs. 1 and 2 showing the elements thereof in finally assembled condition.

In Figs. 1 to 3 of the drawings the invention is illustrated in connection with a frame member 10 which may be any covering supporting element of an aircraft such as a rib member of a wing or flap or fin structure, or the like. The frame member 10 is generally of T shaped sectional form comprising a web portion 11 and a cap strip portion 12, except that the side edges of the cap strip portion 12 thereof are turned upwardly and inwardly to provide a pair of overhanging flanges 14 at opposite sides thereof. The inner edge portions of the flanges 14 are smoothly rounded as at 15 to provide smoothly curved abutments about which the fabric will be subsequently folded, as will be more fully explained hereinafter. The framing member is of such form as may be conveniently and economically produced of metal or any other suitable material as by molding or extrusion processes, or the like.

A locking plate 16 is provided, as illustrated in the drawings, in the form of a strip of sheet metal bent generally into U shaped sectional form and having its opposite side edge portions reversely bent inwardly to provide abutments 17 as integral portions of the plate 16 and projecting from the bottom face thereof. The locking plate 16 may be conveniently formed of a relatively soft metal of readily upsettable characteristics, such as aluminum, or an aluminum alloy, or any other suitable material.

As illustrated in Fig. 1, the process of mounting the covering 18 upon the framing member 10 involves the initial step of arranging the covering upon the outer surface portions of the framing member 10 in its proper position thereon, and then pressing the U shaped locking plate 16 against the outer surface of the covering and into the groove of the framing member toward the position illustrated in Fig. 2, thus carrying a portion of the covering therewith into the groove. The assembly process is then completed by the application of further pressure against the bowed upstanding portion of the locking plate, as by means of a roller or other suitable hand or machine-operated tool, in such manner as to depress the central body portion of the locking plate which simultaneously forces the folded side edge portions thereof outwardly and into the recesses under the overhanging flanges 14 of the framing member.

The locking plate 16 is formed of metal strip so dimensioned in width as to cause the locking plate and the covering material which is wrapped thereabout to extend completely across the space between and to fill the recesses under the flanges of the framing member during the plate depressing process. The abutment portions 17 of the locking plate support the adjacent side portions thereof in elevated position relative to the upper surface of the cap strip 12, and the plate depressing process therefore results ultimately in deformation of the locking plate to the sectional form illustrated in Figs. 3 and 6 wherein the majority of the body of the plate is bowed downwardly beyond the center line 19 extending between the opposite side edge portions thereof (Fig. 6). Thus, the body of the locking plate 16 between the side edge portions thereof is bowed against the adjacent face of the cap strip portion 12 and to a position below the line of the compression forces imposed upon the locking plate from opposite side edges thereof and indicated at 20 in Fig. 6 as a result of tension loads in the covering 18. Consequently, when used in connection with covering materials of the fabric type, for example, which are tightened by shrinking means subsequently to the cover mounting process, the forces of compression transmitted through the locking plate will have substantial components at right angles to the general plane of the plate directed toward the adjacent face of the framing member 10, as illustrated at 21 in Fig. 6. Thus, the tension forces in the covering which would normally tend to draw the covering out of the framing member groove are translated into forces tending to maintain the locking plate 16 in downwardly bowed position against the framing member, and the locking plate will thereby be prevented from bowing upwardly towards its original sectional form as would permit withdrawal of the plate from the framing member. The locking connection between the member 10 and the plate 16 is therefore stable and free from the possibility of accidental disengagement irrespective of the magnitude of the tension stresses in the covering and/or of the shock and vibration forces which may be imposed upon the framing structure under service conditions.

It will be seen that the folded edge portions of the locking plate 16 simultaneously provide the elevating abutment portions 17 for the purpose hereinabove described and smoothly rounded edge surfaces for bearing against the covering 18 where it is locked within the recesses under the flanges 14. Consequently, the covering is at all points in contact with smoothly curved surfaces and is turned upon corner elements of substantial radii so that undue wearing or cutting of the covering is prevented. Subsequent to assembly of the device in the form illustrated in Fig. 3 the covering is preferably doped or otherwise treated in some manner so as to protect it against causes of deterioration such as are met under service conditions. During such covering treating process the dope or other treating substance will penetrate about the edges of the locking plate 16 and the recesses under the flanges 14 and will fill any otherwise unfilled spaces adjacent thereto so that the covering and locking plate unit fully occupies the grooved and recessed portions of the framing member. If desired, a cover strip 22 of fabric or other covering material may be fastened over the depression in the surface of the covering between the flanges 14 of the framing member so as to provide a smooth upper surface throughout the entire extent of the frame covering.

The locking plate 16 may be of any desired longitudinal dimension as may be most convenient for use in any given instance. For example, the locking plate may be of a length commensurate with the length of the framing member 10, or in the alternative, as illustrated in Fig. 4, a series of shorter locking plates having the same sectional form may be arranged along the length of the framing member and individually locked thereto.

For purposes of repair or replacement of the covering 18, the locking plate 16 may be readily removed from operative position within the framing member 10 by deliberate deformation thereof from the sectional form illustrated in Fig. 3 back to the form illustrated in Fig. 2, as by insertion of a screw driver or some similar tool under the end thereof and forcing it along under the length of the plate. Thus, the plate may be pried out of the framing member groove with utmost facility because of the soft upsettable character of the material thereof. However, as explained hereinabove, under service conditions the locking plate 16 is stable in its locking form and cannot accidentally become disengaged.

Figs. 4 and 5 illustrate the application of the invention to an aircraft structure of the type wherein the framing member 10 constitutes a rib element disposed transversely of a major framing element which may be, for example, a beam 24 of a wing or fin structure, or the like. The rib element 10 is connected to the beam 24 by means of angle brackets 26, and it will be seen that the invention lends itself readily to use in combination with any standard form of framing construction wherein the covering sheet 18 is designed to extend over intersecting frame members in flush relation throughout. To this end the plate 16 is preferably withheld from abutting contact against the beam by being terminated as at 25 (Fig. 5) so that the covering 18 may assume a gradual slope between the region of engagement under the adjacent end of the plate 16 and the top surface of the adjacent beam 24. Through use of a cover strip 22 a perfectly smooth outer surface may then be provided.

Although only one form of the invention has been shown and described in detail, it will be apparent to those skilled in the art that the invention is not so limited but that various changes may be made therein without departing from the spirit of the invention or the scope of the appended claims.

I claim:

1. In an aircraft, a frame structure having a flexible covering mounted thereon, said frame structure including a framing member having a cap strip portion and a pair of opposed flanges overhanging said cap strip portion at opposite side edges thereof and forming therewith a groove with a flat bottom, said covering having portions thereof lying against said flanges and having a looped portion thereof disposed between said flanges and against said cap strip portion, a covering locking plate engaged against said covering and disposed within the space outlined by said looped portion of said covering, said locking plate having opposite edges folded under to provide marginal anchoring abutments on the underside of the plate to support the medial portion of the latter at opposite sides spaced from the covering on the bottom wall, the width of the locking plate being enough greater than the width of the groove in the cap strip portion that the medial portion thereof is bowed downwardly from and between its elevated points of support to rest in the plane of said anchoring abutments.

2. In an aircraft, a frame structure having a flexible covering mounted thereon, said frame structure including a framing member having a cap strip portion and a pair of opposed flanges overhanging said cap strip portion at opposite side edges thereof and forming therewith opposed recesses, said covering having portions thereof lying against said flanges and having a looped portion thereof disposed between said flanges and against said cap strip portion, a covering locking plate engaged against said covering and disposed within the space outlined by said looped portion of said covering, the width of said locking plate being enough greater than the width across the recesses to bow the medial portions thereof towards said covering, and anchoring abutment means secured to opposite sides of said bowed medial portions and supporting the adjacent parts of the latter spaced off the covering while permitting other parts of the medial portions bowing downwardly to lock the anchoring abutment means beneath the opposed flanges, said anchoring abutment means substantially conforming to the shape of the opposed recesses for being anchored with the covering therein to provide firm support for the bowed medial portions.

3. In an aircraft, a frame structure having a fabric covering mounted thereon, said frame structure including a framing member having a cap strip portion and a pair of opposed flanges overhanging said cap strip portion at opposite side edges thereof and forming therewith opposed recesses, said covering having portions thereof lying against said flanges and having a looped portion thereof disposed between said flanges and stretched across said cap strip portion, a covering locking plate engaged against said covering and disposed within the space outlined by said looped portion of said covering, said locking plate having opposite side edge portions bent under and back upon itself to provide anchoring abutments engaged in the opposed recesses, the anchoring abutments having flat undersurfaces seating on the covering and extending outwardly from the recesses a distance to provide a support for the medial portion of the locking plate at opposed points elevated off the covering, the width of the locking plate being greater than the width across the opposed recesses whereby to bow such medial portion downwardly onto the covering between the anchoring abutments.

OMER L. WOODSON.